(12) United States Patent
Roach et al.

(10) Patent No.: US 7,403,203 B2
(45) Date of Patent: Jul. 22, 2008

(54) STACKING SERIES OF NON-POWER-OF-TWO FRAME BUFFERS IN A MEMORY ARRAY

(75) Inventors: Bradley Eugene Roach, Costa Mesa, CA (US); Raul Bersamin Oteyza, Costa Mesa, CA (US); David James Duckman, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 557 days.

(21) Appl. No.: 11/179,221

(22) Filed: Jul. 11, 2005

(65) Prior Publication Data

US 2007/0013705 A1    Jan. 18, 2007

(51) Int. Cl.
*G06F 12/02* (2006.01)
*G06F 12/00* (2006.01)
*G06F 13/00* (2006.01)
*G06F 13/28* (2006.01)

(52) U.S. Cl. .................. 345/544; 345/543; 711/170; 711/171; 711/172; 711/173

(58) Field of Classification Search ................ 345/543, 345/544; 711/170–173
See application file for complete search history.

(56) References Cited

U.S. PATENT DOCUMENTS

2006/0075203 A1*   4/2006   Dutta ....................... 711/173

* cited by examiner

*Primary Examiner*—Xiao M. Wu
*Assistant Examiner*—Jacinta Crawford
(74) *Attorney, Agent, or Firm*—Morrison & Foerster LLP

(57) ABSTRACT

Storing frames of data in frame buffers sized to match the frame size when the frame size is not a power-of-two number of bytes is disclosed. The buffer size is chosen to be the largest power-of-two that is less than the frame size. When a frame of data is to be stored, the buffer number of a free buffer is effectively multiplied by the buffer size to obtain a partial frame buffer address Q. The buffer size subtracted from the frame size is referred to as a residual buffer size, and the buffer number is effectively multiplied by the residual buffer size to obtain a residual frame buffer address R. The full frame buffer starting address S=Q+R. For implementations where the difference between the frame size and the buffer size is a power-of-two value, binary shifts and addition can be used instead of a multiplier.

18 Claims, 4 Drawing Sheets

STACKING SERIES OF NON-POWER-OF-TWO FRAME BUFFERS IN A MEMORY ARRAY

FIELD OF THE INVENTION

This invention relates to the buffering of frame payload data, and more particularly, to the efficient storing of frames of data in frame buffers that have been sized to match the frame size of the data being received or transmitted to reduce wasted memory in situations where the frame size is not a power-of-two number of bytes.

BACKGROUND OF THE INVENTION

FIG. 1 illustrates an exemplary Host Bus Adapter (HBA) 100 within a host computer for enabling the host computer to communicate with storage devices in a storage area network (SAN) over a link such as a Fibre Channel (FC) link 102. Frames of Receive (Rx) data 104 received over the link 102 are received by a port 106 within the HBA 100, and frames of Transmit (Tx) data 112 originating from the HBA 100 are transmitted over the link 102 by the port 106. Before the Rx data 104 can be forwarded to host memory (not shown), it must be first placed in an area of local memory 108 reserved for storing the Rx data 104. This area of local memory 108 starts from a base address 110. Local memory area 108 may be partitioned into contiguous equal-size slots or buffers 114, where each slot or buffer 114 holds one frame of Rx data 104. Although the buffers 114 may be contiguous within local memory area 108, the buffers 114 may be written to or read from in a non-contiguous manner, resulting in a patchwork of empty or free buffers spread out over the local memory area 108. New Rx data 104 may therefore be stored into free buffers in non-contiguous buffer locations spread out over the local memory area 108.

Before a frame of Rx data 104 can be stored into the local memory area 108, the address of a free buffer in the local memory area 108 must be provided. However, because Rx data 104 may be received at rates of 4 Gbits/second or higher, the address must be generated quickly. One of the biggest challenges facing serial protocol designs such as FC is managing the buffers 114 at high link speeds. For the case of Rx data 104, the HBA must make a decision on where to store the incoming frame within a short amount of time or run the risk of overrunning a receive First In First Out memory (FIFO) in the port 106 or having to stall the reception of subsequent frames. Even state-of-the-art microprocessor speeds cannot keep up with increasing link speeds and enable the microprocessor to detect that a frame is being received, calculate the memory address to store the frame data, load the memory address into hardware, and have hardware use the memory address to store the incoming frame.

To assist the HBA 100 in generating the addresses of free buffers, the buffers 114 are assigned buffer numbers 116 (e.g. 0 to N−1), where N is the number of buffers in the local memory area 108. For ease of implementation, the number of buffers N in the local memory area 108 is typically chosen so that it can be represented by M bits (e.g. 256 buffers, which can be represented by eight bits), and the size of each buffer is typically chosen to be a power of two number of bytes (e.g. $2^{11}$=2048 bytes). In such an implementation, the starting address for each buffer is a multiple of the power of two (e.g. 1024 bytes, 2048 bytes, 4096 bytes, etc., not including the base address 110).

Within frame Rx queue 118, the buffer numbers 116 of free buffers are stored in a queue such as a Free Buffer FIFO (FB FIFO) queue 120. When the port 106 receives a frame of Rx data 104, Rx frame control information 122 is sent to a frame buffer address generator 124 along with the buffer number 126 of the next available free buffer stored in FB FIFO queue 120. The frame buffer address generator 124 then generates the complete or full frame buffer address 128 of the next available frame buffer for storing the frame of Rx data 104. If the frame size of the Rx data 104 is a power of two number of bytes (e.g. $2^{11}$=2048 bytes), then the generation of the complete address 128 by frame buffer address generator 124 is trivial. FIG. 2 illustrates the full P-bit frame buffer address 228 for a local memory area, where the full frame buffer address 228 is simply the concatenation of a base address 210 and a buffer number 226.

Similarly, before the Tx data 112 from the host memory can be transmitted over the link 102, it must be first placed in an area of local memory 142 reserved for storing the Tx data 112. This area of local memory 142 starts from a base address 144. Local memory area 142 may be partitioned into contiguous equal-size slots or buffers 146, where each slot or buffer 146 holds one frame of Tx data 112. Although the buffers 146 may be contiguous within local memory area 142, the buffers 146 may be written to or read from in a non-contiguous manner, resulting in a patchwork of empty or free buffers spread out over the local memory area 142. New Tx data 112 may therefore be stored into free buffers in non-contiguous buffer locations spread out over the local memory area 142.

Before a frame of Tx data 112 can be stored into the local memory area 142, the address of a free buffer in the local memory area 142 must be provided. To assist the HBA 100 in generating the addresses of free buffers, the buffers 146 are assigned buffer numbers 148 (e.g. 0 to N−1), where N is the number of buffers in the local memory area 142. Note that the storing of Tx data 112 into local memory is under program control. To retrieve the Tx data 112, hardware in the HBA 100 takes a buffer number and a base address to produce a frame start address. The buffer number is included in the information written into a hardware queue to make the Tx data available for transmission. The hardware then retrieves the data from local memory and transmits it on the link. For ease of implementation, the number of buffers N in the local memory area 142 is typically chosen so that it can be represented by M bits (e.g. 256 buffers, which can be represented by eight bits), and the size of each buffer is typically chosen to be a power of two number of bytes (e.g. $2^{11}$=2048 bytes). In such an implementation, the starting address for each buffer is a multiple of the power of two (e.g. 1024 bytes, 2048 bytes, 4096 bytes, etc., not including the base address 110).

Within frame Tx queue 130, the buffer numbers 138 of free buffers are stored in a FB FIFO queue 132. When the host generates a frame of Tx data 112, Tx frame control information 134 is sent to a frame buffer address generator 136 along with the buffer number 138 of the next available free buffer stored in FB FIFO queue 132. The frame buffer address generator 136 then generates the full frame buffer address 140 of the next available frame buffer for storing the frame of Tx data 112 in a manner similar to that described above with respect to Rx data 104 and FIG. 2.

However, a difficulty arises when the frame size of the Rx data 104 and TX data 112 is not a power-of-two number of bytes. For example, the frame size (payload only) of a FC frame is 2112 bytes.

One conventional solution pre-calculates and loads the full frame buffer starting address into the FB FIFO so that it can be retrieved by Rx or free frame buffer address generation logic when necessary. The drawback to this approach is that the hardware must store and manage several bytes for each frame buffer starting address, which may comprise a large number of bits (e.g. 23 bits). Depending on the number of frames that need to be buffered, this approach could require a large Random Access Memory (RAM) to store all the free frame buffer starting addresses.

Another conventional approach is to use dedicated frame buffers (small RAMs) to store the frame payload data. The problem with this approach is that using many small RAMs is not efficient in an Application Specific Integrated Circuit (ASIC) if a large number of frame buffers are required. In terms of ASIC RAM, it is far more efficient to use larger RAMs that can contain multiple frame buffers. Also, the dedicated frame buffer approach implies a fixed number of frame buffers that cannot be changed.

Still another conventional solution to this problem is to utilize a frame buffer size equal to smallest the power of two that is greater than the frame size. In the FC example, because the frame size is 2112 bytes, the smallest power of two that is greater than the frame size is $2^{12}=4096$ bytes. The full address generation would be trivial, as described above, and each 2112 byte frame would be stored into a 4096 byte frame buffer. However, this conventional solution wastes memory, because there are unused bytes in each frame buffer. Firmware-controlled structures may be stored in the unused portions of the buffers to reduce the wasted memory space, but it is inefficient for the firmware to be fragmented into slivers of memory.

Therefore, in situations where the frame size is not a power of two number of bytes, there is a need to store frames of data in frame buffers that have been sized to reduce wasted memory, store only the buffer numbers of free buffers (rather than a full address) in a FB FIFO, and use the buffer numbers to efficiently identify the full frame buffer address of free frame buffers that are to be used to store the frame data.

SUMMARY OF THE INVENTION

Embodiments of the present invention are applicable in situations where the frame size is not a power-of-two number of bytes, and are directed to efficiently storing frames of data in frame buffers that have been sized to match the frame size of the data being received or transmitted to reduce wasted memory, efficiently storing only the frame-independent buffer numbers of free frame-independent buffers (rather than a full address) in a queue (e.g. a FB FIFO), and using the frame-independent buffer numbers to efficiently compute the full frame buffer starting address of the free frame buffer that is to be used to store the next frame of data.

To accomplish this, the local memory is first partitioned into N frame-independent buffers, where the frame-independent buffer size is chosen to be the largest power-of-two that is less than the frame size. The frame-independent buffer numbers of free frame-independent buffers are stored in a FB FIFO. When a frame of data is to be stored in local memory, the frame-independent buffer number of the next available free frame-independent buffer obtained from the FB FIFO is effectively multiplied by the frame-independent buffer size and combined with a base address to obtain a partial frame buffer address Q. In other words, the partial frame buffer address Q for a given buffer number is given as follows:

partial frame
   buffer addr Q=base addr+(frame-indep.buffer num.)(frame-indep.buffer size)

The frame-independent buffer size subtracted from the frame size is referred to as a residual buffer size, and the frame-independent buffer number of the next available free frame-independent buffer is effectively multiplied by the residual buffer size to obtain a residual frame buffer address R. In other words, the residual frame buffer address R for a given frame-independent buffer number is given as follows:

residual frame
   buffer addr R=(frame-indep. buffer num.)(residual buffer size)

The full frame buffer starting address S for any frame buffer is the sum of the partial frame buffer address Q and the residual frame buffer address R for that frame buffer. In other words, the full-frame buffer starting address S for a given frame-independent buffer number is given as follows:

$$\begin{aligned}\text{full frame buffer} \\ \text{starting addr } S\end{aligned} = Q + R$$

$$= \text{base addr} + (\text{frame-indep. buff } num.)(\text{frame-indep. buff size}) +$$

$$(\text{frame-indep. buffer number})(\text{residual buffer size})$$

For implementations where the difference between the frame size and the frame-independent buffer size is a power-of-two value, a multiplier software instruction or multiplier logic circuit is not needed. By avoiding the use of a multiplier, many gates may be saved. Instead, binary shifts and addition can be used. In such implementations, to compute the partial frame buffer address Q, the base address is added to the frame-independent buffer number shifted by a partial frame buffer shift value T determined as follows:

partial frame
   buffer shift value T=$\log_2$(frame-indep. buffer size)

To compute the residual frame buffer address R, the frame-independent buffer number is shifted by a residual frame buffer shift value U determined as follows:

residual frame
   buffer shift value U=$\log_2$(residual buffer size)

As before, the full frame buffer starting address S=Q+R.

To implement the shift and addition operations described above in dedicated hardware, the frame-independent buffer number, obtained from the FB FIFO, is loaded into a partial frame buffer register in the proper locations (e.g. with 11 zeroes in the rightmost bits) to effectively represent a left shift T times, and the partial frame buffer register is combined with the base address to form a first intermediate result. The frame-independent buffer number is also loaded into a residual frame buffer register in the proper locations (e.g. with 6 zeroes in the rightmost bits) to effectively represent a left shift U times, and the two registers are added together in an adder to produce the full frame buffer address.

Embodiments of the present invention can be extended to implementations where the difference between the frame size and the frame-independent buffer size is the sum of two or more power-of-two values. For each power-of-two value, an additional shift and add operation is required.

DETAILED DESCRIPTION OF THE PREFERRED EMBODIMENT

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Embodiments of the present invention are applicable in situations where the frame size is not a power-of-two number of bytes, and are directed to efficiently storing frames of data in frame buffers that have been sized to match the frame size of the data being received or transmitted to reduce wasted memory, efficiently storing only the frame-independent buffer numbers of free frame-independent buffers (rather than a full address) in a queue (e.g. a FB FIFO), and using the free frame-independent buffer numbers to efficiently compute the full frame buffer starting address of the free frame buffer that is to be used to store the next frame of data.

To accomplish this, the local memory is first partitioned into N frame-independent buffers, where the frame-independent buffer size is chosen to be the largest power-of-two that is less than the frame size. Each frame-indepedent buffer is identified by a P-bit frame-independent buffer number. The frame-independent buffer number of free frame-independent buffers are stored in a FB FIFO. When a frame of data is to be stored in local memory, the frame-independent buffer number of the next available free frame-independent buffer obtained from the FB FIFO is effectively multiplied by the buffer size and added to a base address to obtain a partial frame buffer address Q. The frame-independent buffer size subtracted from the frame size is referred to as a residual buffer size, and the frame-independent buffer number of the next available free frame-independent buffer is effectively multiplied by the residual buffer size to obtain a residual frame buffer address R. The full frame buffer address is then computed by effectively adding together the partial frame buffer address Q and the residual frame buffer address R.

As noted above, the FC specification allows a maximum frame payload size of 2112 bytes. The frame size is not a power-of-two number of bytes (e.g. not 1024 bytes, 2048 bytes, 4096 bytes, etc.). Embodiments of the present invention are therefore applicable to the FC specification, and are described herein primarily utilizing FC as an example for purposes of illustration and explanation only. However, it should be understood that embodiments of the present invention are applicable to any protocol having a frame size that is not a power-of-two number of bytes.

Figure 3:
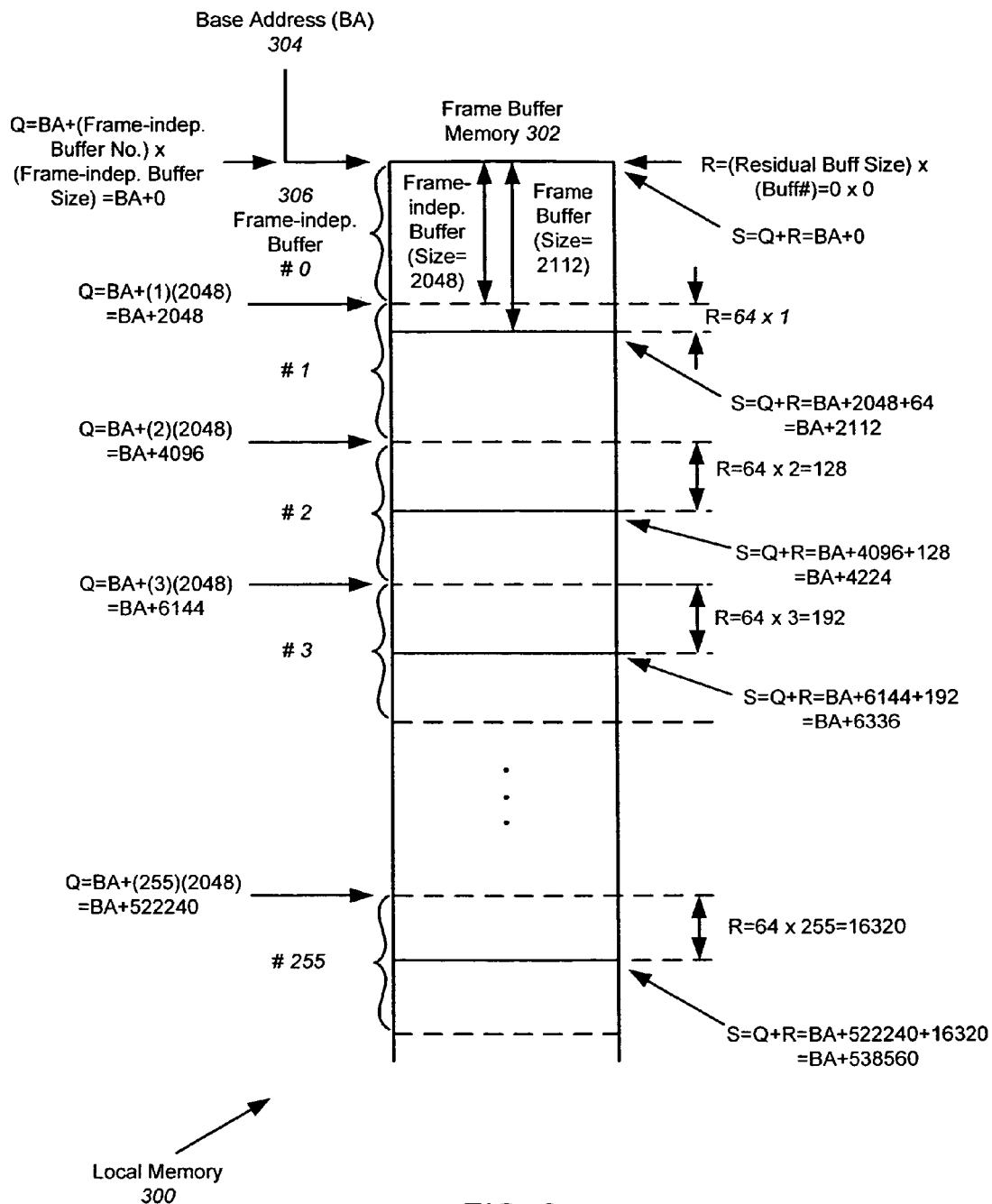
FIG. 3 illustrates an exemplary local memory with a portion identified as a frame buffer memory starting at base address for storing frame buffers having a frame size that is not a power-of-two number of bytes according to embodiments of the present invention.

As described above, in embodiments of the present invention the local memory is first partitioned into N frame-independent buffers, where the frame-independent buffer size is chosen to be the largest power-of-two that is less than the frame size. In the example case of FC, which has a frame size of 2112 bytes, the largest power of two less than the frame size is $2^{11}$=2048 bytes. Thus, the frame-independent buffer size is chosen to be 2048 bytes. FIG. 3 illustrates a local memory 300 with a portion identified as a frame buffer memory 302 starting at base address 304 for storing frame buffers. In the present example, the frame-independent buffer size is 2048 bytes. Each frame-independent buffer is identified by a frame-independent buffer number 306.

In the FC example of FIG. 3, the difference between the frame size of 2112 bytes and the frame-independent buffer size of 2048 bytes is referred to as the residual buffer size. In the present example, the residual buffer size is 64 bytes (2112-2048).

As described above, embodiments of the present invention efficiently compute the full frame buffer starting address of the free frame buffer that is to be used to store the next frame of data. As FIG. 3 illustrates, the full frame buffer starting address S for any buffer is the sum of the partial frame buffer address Q (see left side of FIG. 3) and the residual frame buffer address R (see right side of FIG. 3) for that buffer. The partial frame buffer address Q for a given buffer number is given as follows:

partial frame
buffer addr Q=base addr+(frame-indep. buffer num.)(frame-indep. buffer size)

The residual frame buffer address R for a given frame-independent buffer number is given as follows:

residual frame
buffer addr R=(frame-indep. buffer num.)(residual buffer size)

Therefore, the full frame buffer starting address S for a given frame-independent buffer number is given as follows:

$$\text{full frame buffer starting addr } S = Q + R$$
$$= \text{base addr} + (\text{frame-indep. buff num.})(\text{frame-indep. buff size}) +$$
$$(\text{frame-indep. buffer number})(\text{residual buffer size})$$

In embodiments of the present invention, the frame-independent buffer number can be represented by P bits. For example, if P=eight, then $2^8$=256 frame-independent buffers can be uniquely identified by the 8-bit frame-independent buffer number. Thus, in the present example, only eight bits need to be stored in the FB FIFO for each free frame-independent buffer and only 256 bytes are required to uniquely identify the starting address of all frame buffers. By comparison, 20 bits are required to define the full starting address of each frame buffer, and a total of 640 bytes are required to uniquely identify the starting address of all frame buffers (256 frame buffers*20 bits/frame buffer*1 byte/8 bits=640 bytes).

When a frame of data is to be stored in the frame buffer memory 302, the frame-independent buffer number 306 of the next available free frame-independent buffer is popped from the FB FIFO, and is used in the calculation described above to compute the full frame buffer starting address S. Note that because each frame buffer is sized to match the frame size of the data being received or transmitted, frames of data can be efficiently stored without wasted memory.

The computations to calculate the full frame buffer starting address S described above may be performed in dedicated hardware for maximum computational speed, and may also be performed by firmware when the stored frame data is to be transferred to host memory or in other lower speed applications. Note also that when the stored frame data is retrieved at a later time, the firmware in the host may effectively perform the same calculations to generate the full frame buffer address of the frame data. The above-described calculations show that the full frame buffer starting address can be computed from the frame-independent buffer number using addition and multiplication operations.

Figure 1:
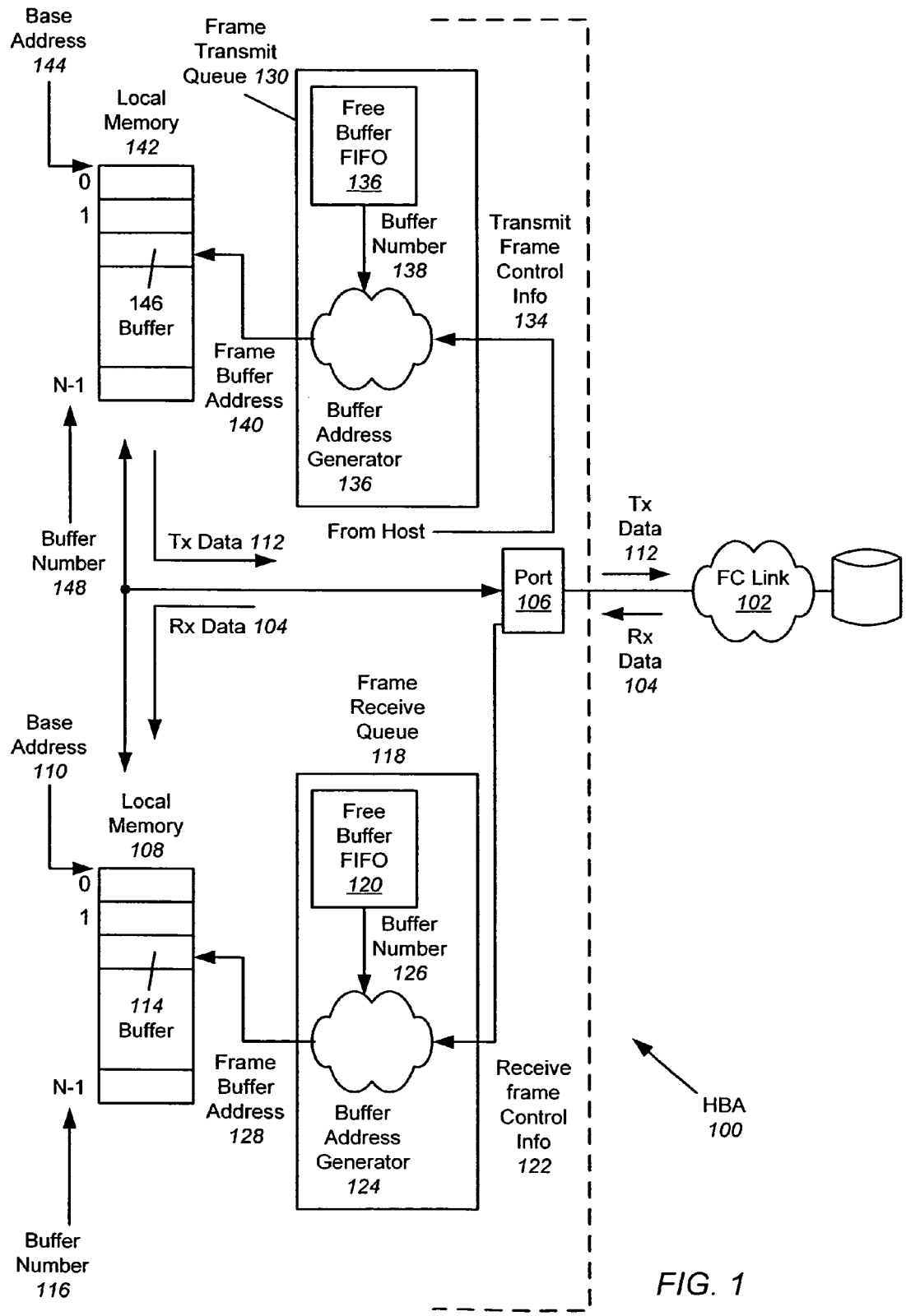
FIG. 1 is an exemplary block diagram of an HBA including frame buffer address generators for generating the full frame buffer starting address according to embodiments of the present invention.
Figure 2:
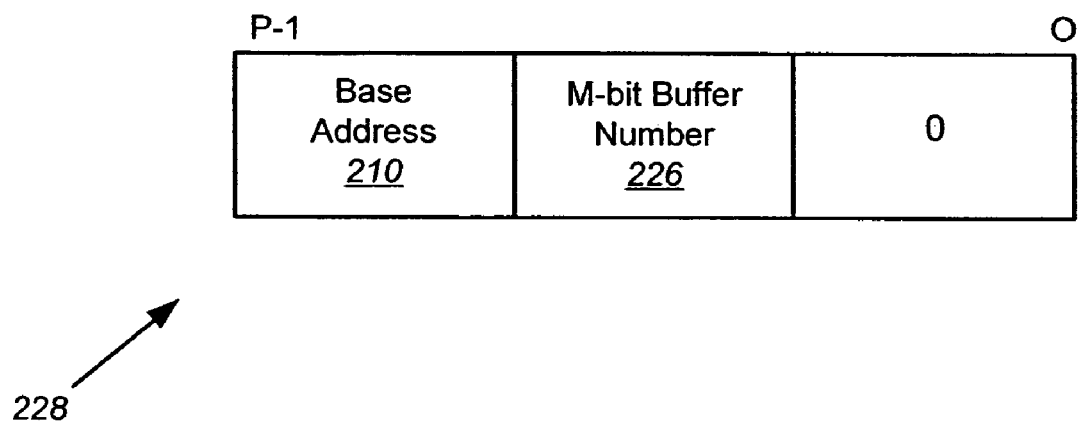
FIG. 2 illustrates an exemplary full P-bit frame buffer address for the local memory in a conventional implementation where the frame size is a power-of-two number of bytes and the full frame buffer address is simply the concatenation of the base address and the buffer number.

However, for implementations where the difference between the frame size and the frame-independent buffer size is a power-of-two value, a multiplier software instruction or multiplier logic circuit is not needed. By avoiding the use of a multiplier, many gates may be saved. Instead, binary shifts and addition can be used. Implementing the dedicated hardware in this manner simplifies the address generation logic and can significantly reduce gate counts. This hardware is located in the frame buffer address generators 124 and 136 shown in FIG. 1.

In such implementations, to compute the partial frame buffer address Q, the base address is added to the frame-independent buffer number shifted by a partial frame buffer shift value T determined as follows:

partial frame
buffer shift value T=$\log_2$(frame-independent buffer size)

To compute the residual frame buffer address R, the frame-independent buffer number is shifted by a residual frame buffer shift value U determined as follows:

residual frame
buffer shift value U=$\log_2$(residual buffer size)

In the FC example described above, the frame size is 2112 bytes and the frame-independent buffer size is 2048 bytes, so the difference is 64 bytes, which is a power-of-two value ($2^6$=64). Therefore, binary shifts and addition can be used. The partial frame buffer shift value T=$\log_2$(buffer size)=$\log_2$(2048)=11, while the residual frame buffer shift value U=$\log_2$(residual buffer size)=$\log_2$(64)=6. Therefore, the full frame buffer starting address for the exemplary frame-independent buffer numbers 0, 1, 2, 3 and 255 are computed as follows (shown in binary for ease of understanding):

Buffer # 0

(base address)
00000000                buffer number shifted left 11
                        times
00000000                buffer number shifted left 6
                        times =
(base address) 00000000000000000000    base address + 0 (decimal)
Buffer # 1

(base address)
00000001                buffer number shifted left 11
                        times
00000001                buffer number shifted left 6
                        times =
(base address) 00000000100001000000    base address + 2112 (decimal)
Buffer # 2

(base address)
00000010                buffer number shifted left 11
                        times
00000010                buffer number shifted left 6
                        times =
(base address) 00000001000010000000    base address + 4224 (decimal)
Buffer # 3

(base address)
00000011                buffer number shifted left 11
                        times
00000011                buffer number shifted left 6
                        times =
(base address) 00000001100011000000    base address + 6336 (decimal)
Buffer # 255

(base address)
11111111                buffer number shifted left 11
                        times
11111111                buffer number shifted left 6
                        times =
(base address) 10000011011111000000    base address + 538560 (decimal)

Note that the full frame buffer starting addresses (S) computed above correspond to those computed in decimal in FIG. 3.

Figure 4:
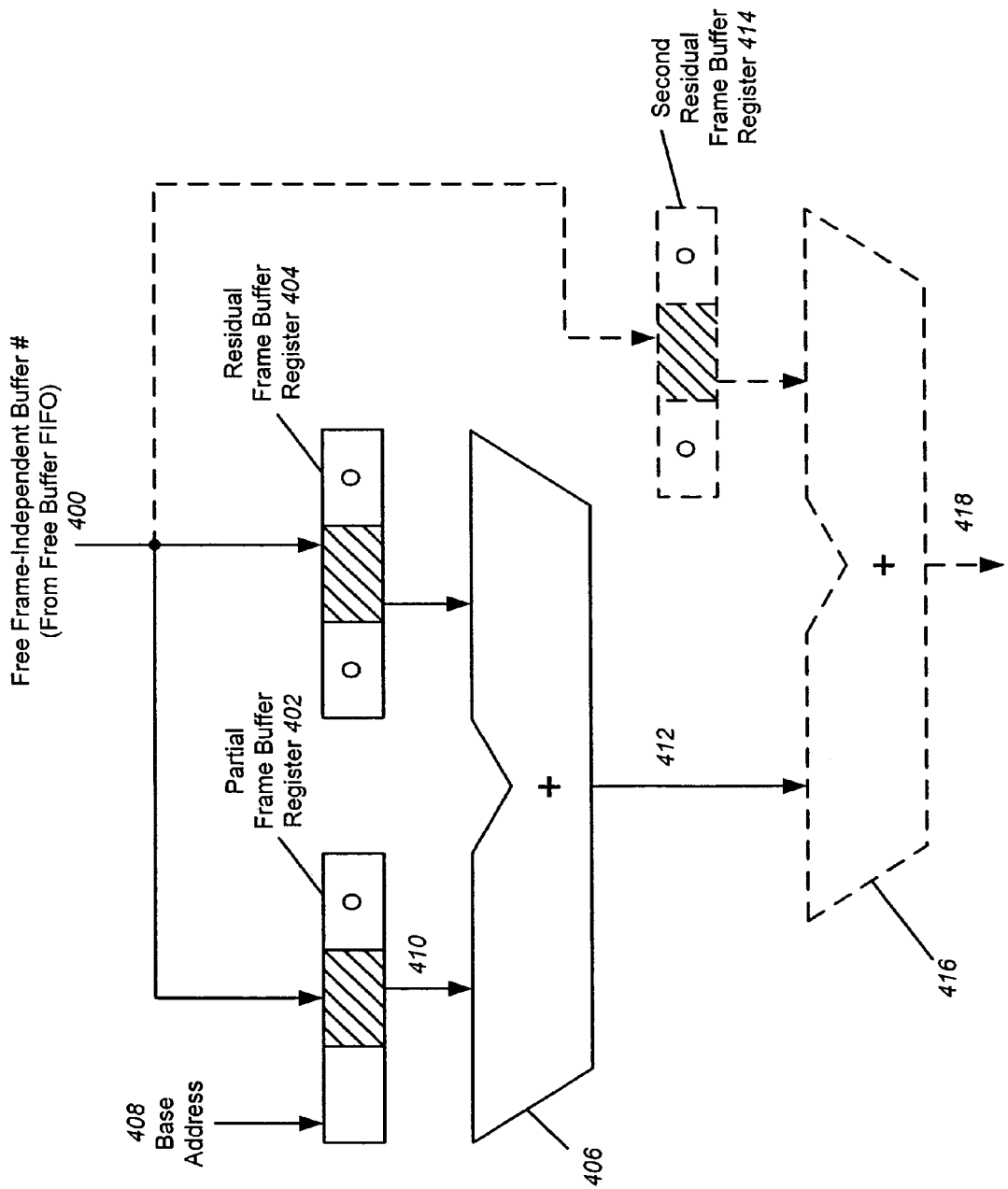
FIG. 4 illustrates an exemplary block diagram of the effective shift and add operations that are required to generate the full frame buffer starting address according to embodiments of the present invention.

The shift and addition operations described above are illustrated in FIG. 4. The frame-independent buffer number 400, obtained from the FB FIFO, is loaded into partial frame buffer register 402 in the proper locations (e.g. with 11 zeroes in the rightmost bits) to effectively represent a left shift T times, and the partial frame buffer register 402 is combined with the base address 408 to form a first intermediate result 410. The frame-independent buffer number 400 is also loaded into residual frame buffer register 404 in the proper locations (e.g. with 6 zeroes in the rightmost bits) to effectively represent a left shift U times, and the two registers are added together in adder 406 to produce the full frame buffer address 412. In other words, no shifting operation actually occurs, although in alternative embodiments the frame-independent buffer number could be shifted left into each register the appropriate number of times.

Embodiments of the present invention can also be extended to implementations where the difference between the frame size and the frame-independent buffer size is not a power-of-two value, but may be the sum of two or more power-of-two values. For example, if the frame size is 2144, the difference between the frame size and the frame-independent buffer size is 2144−2048=96, which is not a power-of-two value, but is the sum of two power-of-two values ($2^6$+$2^5$=64+32=96). The first power-of-two value, as before, is the residual buffer size, while the second power-of-two value is referred to as a second residual buffer size.

In such implementations, a second residual frame buffer shift value V is needed along with the previous shift values. To compute a second residual frame buffer address W, the frame-independent buffer number is shifted by the second residual frame buffer shift value V determined as follows:

second residual frame buffer shift value V=$\log_2$(second residual buffer size)

In the example described above, the partial frame buffer shift value is $\log_2$(buffer size)=$\log_2$(2048)=11, the residual frame buffer shift value is $\log_2$(residual buffer size)=$\log_2$(64) =6, and the second residual frame buffer shift value is $\log_2$ (second residual buffer size)=$\log_2$(32)=5. Therefore, the full frame buffer starting address for the exemplary frame-independent buffer numbers 0, 1, 2, 3 and 255 are computed as follows (shown in binary for ease of understanding):

Buffer # 0

| (base address) | | |
|---|---|---|
| | 00000000 | buffer number shifted left 11 times |
| | 00000000 | buffer number shifted left 6 times |
| | 00000000 | buffer number shifted left 5 times = |
| (base address) 00000000000000000000 | | base address + 0 (decimal) |

Buffer # 1

| (base address) | | |
|---|---|---|
| | 00000001 | buffer number shifted left 11 times |
| | 00000001 | buffer number shifted left 6 times |
| | 00000001 | buffer number shifted left 5 times = |
| (base address) 00000000100001100000 | | base address + 2144 (decimal) |

Buffer # 2

| (base address) | | |
|---|---|---|
| | 00000010 | buffer number shifted left 11 times |
| | 00000010 | buffer number shifted left 6 times |
| | 00000010 | buffer number shifted left 5 times = |
| (base address) 00000001000011000000 | | base address + 4288 (decimal) |

Buffer # 3

| (base address) | | |
|---|---|---|
| | 00000011 | buffer number shifted left 11 times |
| | 00000011 | buffer number shifted left 6 times |
| | 00000011 | buffer number shifted left 5 times = |
| (base address) 00000001100100100000 | | base address + 6432 (decimal) |

Buffer # 255

| (base address) | | |
|---|---|---|
| | 11111111 | buffer number shifted left 11 times |
| | 11111111 | buffer number shifted left 6 times |
| | 11111111 | buffer number shifted left 5 times = |
| (base address) 10000101011110100000 | | base address + 546720 (decimal) |

The extra shift and addition operations described above are illustrated in dashed lines in FIG. 4. The frame-independent buffer number 400 is loaded into second residual frame buffer register 404 in the proper locations (e.g. with 5 zeroes in the rightmost bits) to effectively represent a left shift V times, and this register is added together with the result 412 in adder 416 to produce the full frame buffer address 418.

The preceding example illustrates that embodiments of the present invention can be extended to implementations where the difference between the frame size and the frame-independent buffer size is the sum of two or more power-of-two values. For each power-of-two value, an additional shift and add operation is required.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for efficiently storing frames of data in a plurality of contiguous frame buffers in a frame buffer memory when a frame size of the frames of data is not a power-of-two number of bytes, comprising:

partitioning the frame buffer memory into N frame-independent buffers, where N is a power-of-two, each frame-independent buffer representable by a M-bit frame-independent buffer number and having a frame-independent buffer size chosen to be a largest power-of-two value less than the frame size;

computing a residual buffer size as a difference between the frame size and the frame-independent buffer size; and for each frame of data to be stored, computing a frame buffer address S utilizing a particular frame-independent buffer number, the frame-independent buffer size and the residual buffer size, and storing the frame of data into the frame buffer having the frame buffer address S, each frame buffer sized to match the non-power-of-two frame size of the frames of data.

2. The method as recited in claim 1, further comprising:

for each frame of data to be stored, obtaining the particular frame-independent buffer number of a free frame-independent buffer.

3. The method as recited in claim 2, further comprising:

storing the frame-independent buffer numbers of the free frame-independent buffers in a queue; and for each frame of data to be stored, obtaining the particular frame-independent buffer number by popping it off the queue.

4. The method as recited in claim 1, the step of computing a frame buffer address S further comprising:

multiplying the particular frame-independent buffer number and the frame-independent buffer size and adding a base address to obtain a partial frame buffer address Q;

multiplying the particular frame-independent buffer number and the residual buffer size to obtain a residual frame buffer address R; and adding the partial frame buffer address Q and the residual frame buffer address R to obtain the frame buffer address S.

5. The method as recited in claim 1, wherein when the residual buffer size is a power-of-two value, the step of computing a frame buffer address S further comprises:

shifting the particular frame-independent buffer number by a partial frame buffer shift value T, where T=$\log_2$ (frame-independent buffer size), and adding a base address to obtain a partial frame buffer address Q;

shifting the particular frame-independent buffer number by a residual frame buffer shift value U, where U=$\log_2$ (residual buffer size), to obtain a residual frame buffer address R; and adding the partial frame buffer address Q and the residual frame buffer address R to obtain the frame buffer address S.

6. The method as recited in claim 1, wherein when the residual buffer size is a power-of-two value, the step of computing a frame buffer address S further comprises:
    loading the particular frame-independent buffer number into a partial frame buffer register with zeroes in the T Least Significant Bits (LSBs), where $T=\log_2$(frame-independent buffer size), and loading a base address into the Most Significant Bits (MSBs) of the partial frame buffer register to obtain a partial frame buffer address Q;
    loading the particular frame-independent buffer number into a residual frame buffer register with zeroes in the U LSBs, where $U=\log_2$(residual buffer size), and loading zeroes into the MSBs of the residual frame buffer register, to obtain a residual frame buffer address R; and
    adding the partial frame buffer address Q and the residual frame buffer address R to obtain the frame buffer address S.

7. The method as recited in claim 1, wherein when a difference between the frame size and the frame-independent buffer size is a sum of a first power-of-two value and a second power-of-two value, the method further comprises:
    determining the residual buffer size as the first power-of-two value rather than the difference between the frame size and the frame-independent buffer size;
    determining a second residual buffer size as the second power-of-two value; and
    computing the frame buffer address S by
        shifting the particular frame-independent buffer number by a partial frame buffer shift value T, where $T=\log_2$ (frame-independent buffer size), and adding a base address to obtain a partial frame buffer address Q,
        shifting the particular frame-independent buffer number by a residual frame buffer shift value U, where $U=\log_2$ (residual buffer size), to obtain a residual frame buffer address R,
        shifting the particular frame-independent buffer number by a second residual frame buffer shift value V, where $U=\log_2$(second residual buffer size), to obtain a second residual frame buffer address W, and
        adding the partial frame buffer address Q, the residual frame buffer address R, and the second residual frame buffer address W to obtain the frame buffer address S.

8. The method as recited in claim 1, wherein when a difference between the frame size and the frame-independent buffer size is a sum of a first power-of-two value and a second power-of-two value, the method further comprises:
    determining the residual buffer size as the first power-of-two value rather than the difference between the frame size and the frame-independent buffer size;
    determining a second residual buffer size as the second power-of-two value; and
    computing the frame buffer address S by
        loading the particular frame-independent buffer number into a partial frame buffer register with zeroes in the T Least Significant Bits (LSBs), where $T=\log_2$(frame-independent buffer size), and loading a base address into the Most Significant Bits (MSBs) of the partial frame buffer register to obtain a partial frame buffer address Q,
        loading the particular frame-independent buffer number into a residual frame buffer register with zeroes in the U LSBs, where $U=\log_2$(residual buffer size), and loading zeroes into the MSBs of the residual frame buffer register, to obtain a residual frame buffer address R,
        loading the particular frame-independent buffer number into a second residual frame buffer register with zeroes in the V LSBs, where $V=\log_2$(second residual buffer size), and loading zeroes into the MSBs of the residual frame buffer register, to obtain a second residual frame buffer address W, and
        adding the partial frame buffer address Q, the residual frame buffer address R, and the second residual frame buffer address W to obtain the frame buffer address S.

9. A system for efficiently storing frames of data in a plurality of contiguous frame buffers in a frame buffer memory when a frame size of the frames of data is not a power-of-two number of bytes, comprising:
    a frame buffer memory partitioned into N frame-independent buffers, where N is a power-of-two, each frame-independent buffer representable by a M-bit frame-independent buffer number and having a frame-independent buffer size chosen to be a largest power-of-two value less than the frame size; and
    a frame buffer address generator coupled to the frame buffer memory, the frame buffer address generator configured for storing a residual buffer size equal to a difference between the frame size and the frame-independent buffer size, and, for each frame of data to be stored, computing a frame buffer address S utilizing a particular frame-independent buffer number, the frame-independent buffer size and the residual buffer size, and storing the frame of data into the frame buffer having the frame buffer address S, each frame buffer sized to match the non-power-of-two frame size of the frames of data.

10. The system as recited in claim 9, further comprising a queue coupled to the frame buffer address generator for storing the frame-independent buffer numbers of free frame-independent buffers and providing the particular frame-independent buffer number to the frame buffer address generator for each frame of data to be stored.

11. The system as recited in claim 9, the frame buffer address generator further configured for computing the frame buffer address S by:
    multiplying the particular frame-independent buffer number and the frame-independent buffer size and adding a base address to obtain a partial frame buffer address Q;
    multiplying the particular frame-independent buffer number and the residual buffer size to obtain a residual frame buffer address R; and
    adding the partial frame buffer address Q and the residual frame buffer address R to obtain the frame buffer address S.

12. The system as recited in claim 9, the frame buffer address generator further configured such that when the residual buffer size is a power-of-two value, the frame buffer address generator computes the frame buffer address S by:
    shifting the particular frame-independent buffer number by a partial frame buffer shift value T, where $T=\log_2$ (frame-independent buffer size), and adding a base address to obtain a partial frame buffer address Q;
    shifting the particular frame-independent buffer number by a residual frame buffer shift value U, where $U=\log_2$ (residual buffer size), to obtain a residual frame buffer address R; and
    adding the partial frame buffer address Q and the residual frame buffer address R to obtain the frame buffer address S.

13. The system as recited in claim 9, the frame buffer address generator comprising:
    a partial frame buffer register for loading the particular frame-independent buffer number into the partial frame buffer register with zeroes in the T Least Significant Bits (LSBs), where $T=\log_2$(frame-independent buffer size), and loading a base address into the Most Significant Bits (MSBs) of the partial frame buffer register to obtain a partial frame buffer address Q when the residual buffer size is a power-of-two value;

a residual frame buffer register for loading the particular frame-independent buffer number into the residual frame buffer register with zeroes in the U LSBs, where $U=\log_2$(residual buffer size), and loading zeroes into the MSBs of the residual frame buffer register to obtain a residual frame buffer address R when the residual buffer size is a power-of-two value; and an adder coupled to the partial frame buffer register and the residual frame buffer register for adding the partial frame buffer address Q and the residual frame buffer address R to obtain the frame buffer address S when the residual buffer size is a power-of-two value.

14. The system as recited in claim 9, the frame buffer address generator further configured such that when a difference between the frame size and the frame-independent buffer size is a sum of a first power-of-two value and a second power-of-two value, the frame buffer address generator computes the frame buffer address S by:

determining the residual buffer size as the first power-of-two value rather than the difference between the frame size and the frame-independent buffer size;

determining a second residual buffer size as the second power-of-two value;

shifting the particular frame-independent buffer number by a partial frame buffer shift value T, where $T=\log_2$ (frame-independent buffer size), and adding a base address to obtain a partial frame buffer address Q;

shifting the particular frame-independent buffer number by a residual frame buffer shift value U, where $U=\log_2$ (residual buffer size), to obtain a residual frame buffer address R;

shifting the particular frame-independent buffer number by a second residual frame buffer shift value V, where $U=\log_2$(second residual buffer size), to obtain a second residual frame buffer address W; and adding the partial frame buffer address Q, the residual frame buffer address R, and the second residual frame buffer address W to obtain the frame buffer address S.

15. The system as recited in claim 9, the frame buffer address generator further configured such that when a difference between the frame size and the frame-independent buffer size is a sum of a first power-of-two value and a second power-of-two value, the frame buffer address generator:

determines the residual buffer size as the first power-of-two value rather than the difference between the frame size and the frame-independent buffer size; and determines a second residual buffer size as the second power-of-two value; and wherein the frame buffer address generator further comprises a partial frame buffer register for loading the particular frame-independent buffer number with zeroes in the T Least Significant Bits (LSBs), where $T=\log_2$(frame-independent buffer size), and loading a base address into the Most Significant Bits (MSBs) of the partial frame buffer register to obtain a partial frame buffer address Q, a residual frame buffer register for loading the particular frame-independent buffer number with zeroes in the U LSBs, where $U=\log_2$(residual buffer size), and loading zeroes into the MSBs of the residual frame buffer register to obtain a residual frame buffer address R, a second residual frame buffer register for loading the particular frame-independent buffer number with zeroes in the V LSBs, where $V=\log_2$(second residual buffer size), and loading zeroes into the MSBs of the residual frame buffer register to obtain a second residual frame buffer address W, and an adder for adding the partial frame buffer address Q, the residual frame buffer address R, and the second residual frame buffer address W to obtain the frame buffer address S.

16. A Host Bus Adapter (HBA) comprising the system of claim 9.

17. A host computer comprising the HBA of claim 16.

18. A Storage Area Network (SAN) comprising the host computer of claim 17.

* * * * *